Figure 1:
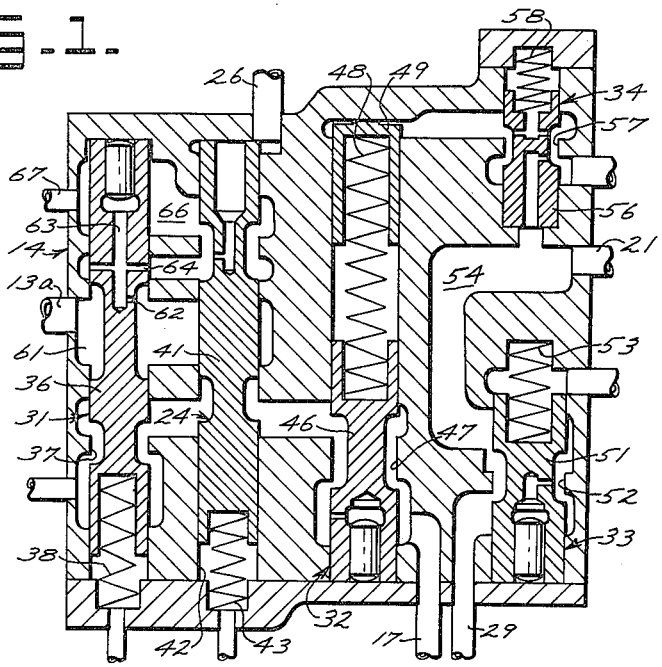

Nov. 16, 1965    G. D. ROHWEDER ETAL    3,217,726
TRANSMISSION CONTROL SYSTEM EMPLOYING
A DIFFERENTIAL CHECK VALVE
Filed Feb. 25, 1963    3 Sheets-Sheet 1

INVENTORS
GERALD D. ROHWEDER
HUGH C. MORRIS
BY
*Fryer and Zimvold*
ATTORNEYS

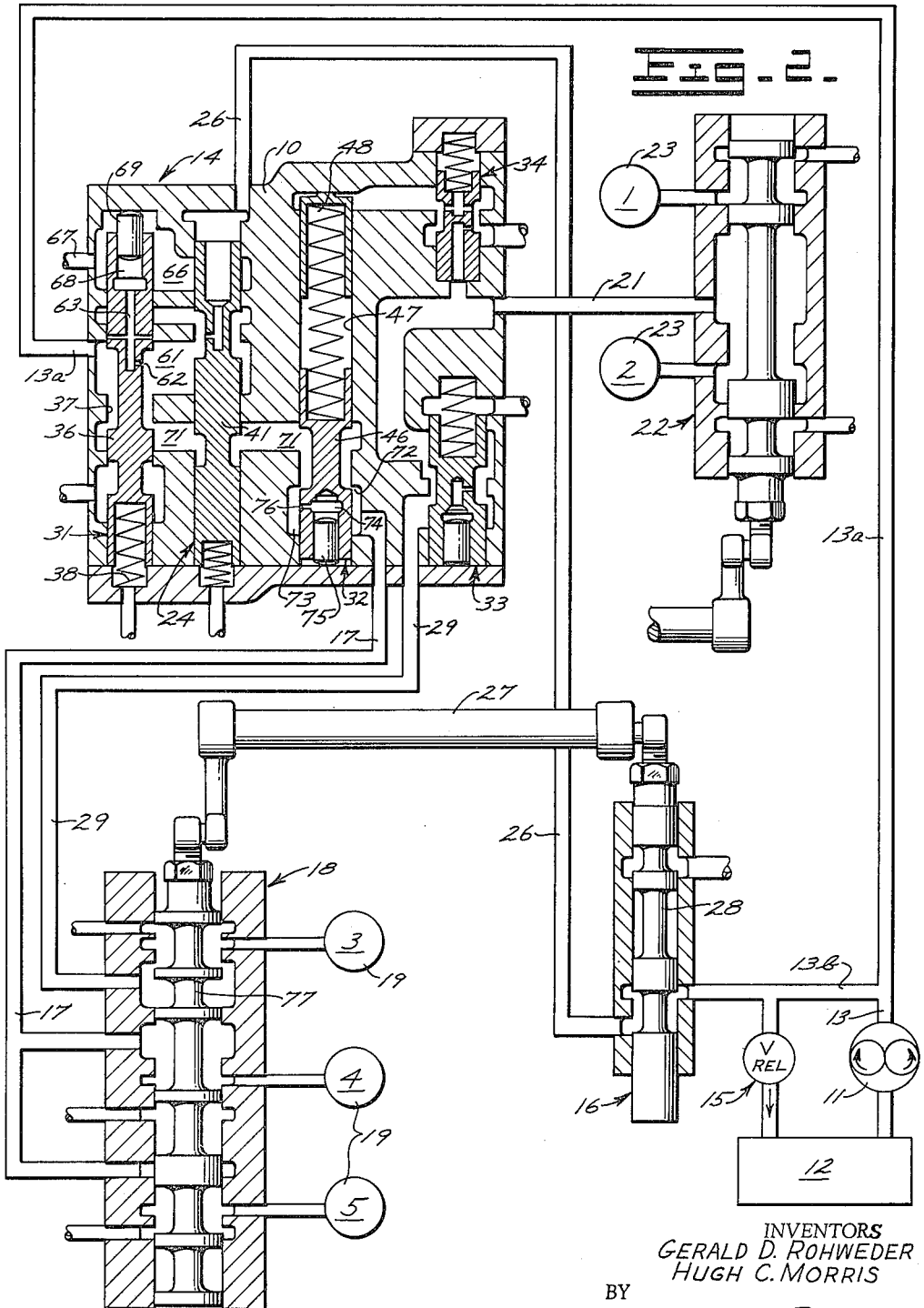

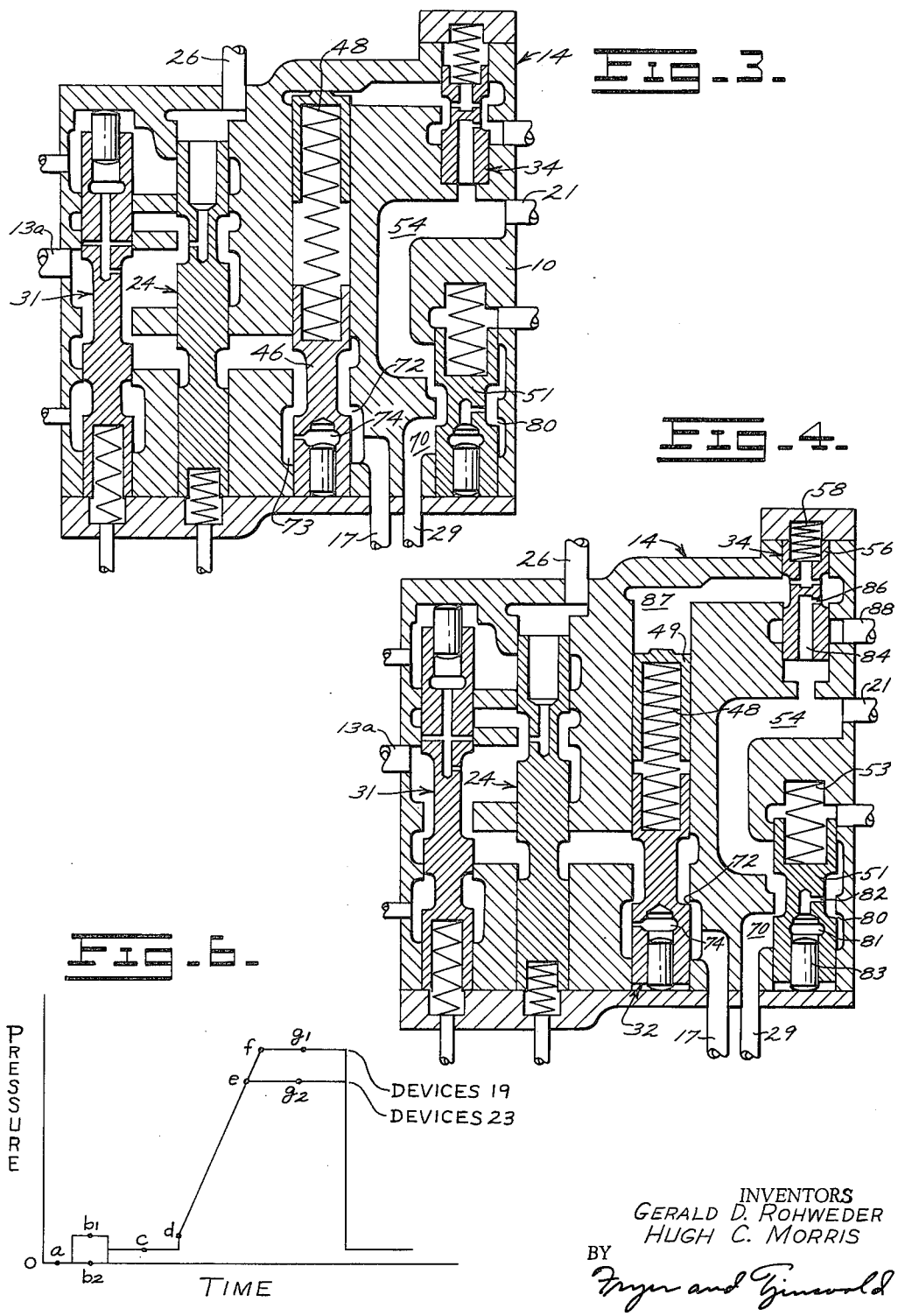

United States Patent Office 3,217,726
Patented Nov. 16, 1965

3,217,726
TRANSMISSION CONTROL SYSTEM EMPLOYING A DIFFERENTIAL CHECK VALVE
Gerald D. Rohweder and Hugh C. Morris, Peoria, Ill., assignors to Caterpillar Tractor Co., Peoria, Ill., a corporation of California
Filed Feb. 25, 1963, Ser. No. 260,729
5 Claims. (Cl. 137—37)

The present invention relates to transmission control systems and more particularly to a transmission control system including a differential check value.

Transmissions which are employed in heavy duty vehicles such as earth moving equipment often require that more than a single clutch or brake be engaged in order to condition the transmission to a desired driving gear ratio. Transmissions of this type include those having a set of engaging means which determine the driving gear ratio, and a separate pair of engaging means which determine the direction of the power through the transmission. Another transmission system requiring more than a single engaging means to be activated to condition the transmission into a driving gear employs a pair of transmission in tandem in which case it is necessary to actuate an engaging means in each of the transmissions in order to condition the overall system into a driving gear. In order that a particular pair of engaging means can be actuated when desired, hydraulic control systems are provided which direct working fluid to these engaging means in response to an operator's command. These control systems also serve the function of coordinating the engagement of the clutches or brakes.

It is common practice in the art to provide transmissions with control systems which insure that the clutches or brakes from a particular set are always responsible for picking up the load while the clutches or brakes of the other set, which are necessary to condition the transmission to a particular driving gear, do not experience heavy loads. It has been found, however, that certain advantages are gained by providing a control system to a transmission wherein the engagement of a pair of clutches or brakes takes place at the same time and at the same rate such that the load being experienced is shared by both of the engaging means.

Before simultaneous clutch engagement can be accomplished, a number of problems must be overcome. One of these problems is a result of the fact that one set of clutches or brakes will generally have a maximum pressure which can be applied thereto without destroying the seals which are employed in conjunction therewith (normally rotating clutches). Since this maximum pressure is usually lower than the pressure necessary to insure firm engagement of the other set of clutches or brakes, the desired result is not achieved by simply supplying working fluid to the engaging means from the same conduit.

Accordingly, it is an object of the present invention to provide a control system for a transmission wherein fluid pressure is provided to two separate devices at the same pressure levels and rates of increase in pressure but where the maximum pressure applied to one device is less than that delivered to the other.

It is another object of the present invention to provide a transmission control system including a differential check valve such that two separate devices can receive virtually the same pressure until one reaches its maximum pressure after which time the other continues to receive increased pressure.

Further and more specific objects and advantages of the invention will be made apparent in the following specification wherein a preferred form of the invention is described by reference to the accompanying drawings.

Figure 2:
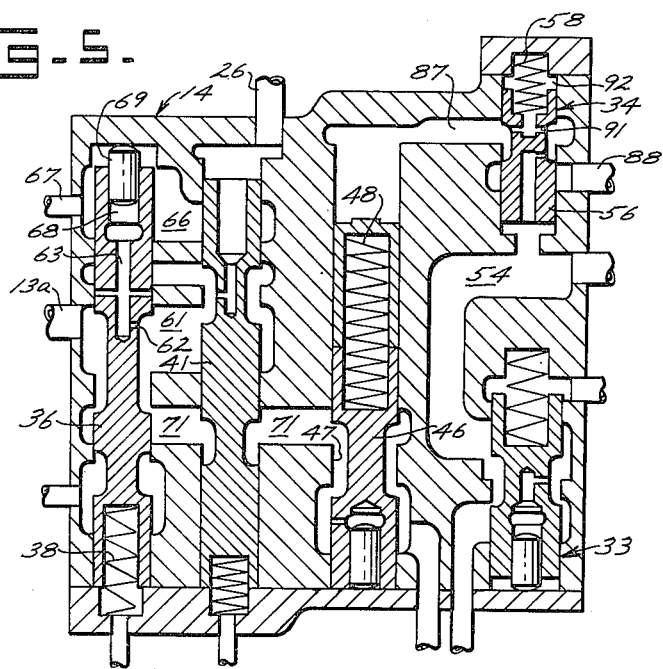

In the drawings:
FIG. 1 is a cross sectional elevation of a control valve group including a differential check valve wherein the components are in the positions which they assume when no hydraulic pressure exists or is applied to the group;
FIG. 2 is a generally schematic illustration showing the control system of the present invention along with the clutch engaging means to be provided with pressure and the source of hydraulic working fluid, wherein the valve group is shown in cross section with its components in the positions which they assume when the transmission is conditioned to neutral;
FIG. 3 is a cross sectional elevation similar to FIG. 1 wherein the components are shown in the positions which they assume when the transmission has been shifted from a neutral condition to one of the driving gears;
FIG. 4 is a view similar to FIG. 3 with the components shown in the positions which they assume when the fluid pressure being delivered to the actuating devices is being modulated;
FIG. 5 is the same as FIG. 4 except that the components of the valve group are shown in the positions which they assume when the transmission is fully engaged and operating in a driving gear; and
FIG. 6 is a pressure vs. time trace showing the different pressures which exist at the output conduits of the control valve system during the different phases of operation.

Referring now to FIG. 2, a pump 11 draws fluid from a reservoir 12 and delivers it via a conduit 13 to a branch conduit 13a leading to a pressure control valve group 14, and to a branch conduit 13b leading to a safety reset valve 16. A relief valve 15 maintains the pressure of the fluid in conduit 13 at a desired pressure. The pressure control valve group 14 has an output conduit 17 which leads to a selector valve 18, the position of which determines the particular one of fluid operated devices 19 to which working fluid is directed. A second output from control valve group 14 is provided by conduit 21 which communicates with a selector valve 22, which determines which, if either, of the fluid operated devices 23 is provided with working fluid. While conduits 13a provide valve group 14 with a supply of working fluid at a preset pressure, this fluid is not free to pass into conduit 17 unless a safety valve 24 has been properly conditioned. The conditions which will enable safety valve 24 to allow fluid from conduit 13a to pass to conduit 17 exist when fluid pressure exists in conduit 26 which communicates between valve group 14 and safety reset valve 16. The only time that safety reset valve 16 will be conditioned to allow the pressure fluid in conduit 13b to pass therethrough into conduit 26 is when a control shaft 27 which is mechanically connected to the spool 28 of valve 16 is conditioned to the position which corresponds to neutral.

Thus, to initially engage the gears of the transmission it is necessary to first shift the control levers to neutral. Once this neutral position is obtained the pressure fluid in conduit 26 will act upon safety valve 24 enabling pressure to exist in conduit 17 and thus pass to selector valve 18. When the transmission controls are then positioned to a driving gear a portion of the pressure fluid directed to selector valve 18 via conduit 17 is directed back to control valve group 14 by way of a connecting conduit 29. The pressure fluid in conduit 29 enters the pressure control valve group 14 and eventually passes to conduit 21 and selector valve 22. The pressure fluid which passes to the selector valve via conduits 17 and 21 is maintained at the same modulated pressure until a preset maximum pressure is experienced in conduit 21 at which time the pressure in that conduit ceases to increase. The pressure in conduit 17, however, continues to increase to a maximum value designed for the fluid actuated devices associated with selector valve 18. The means provided to give rise to the operation described will be set forth in detail below by showing the disposition of the various components of the valve control group during different stages of operation.

The pressure control valve group 14 includes a sequence valve 31, safety valve 24, a modulating reducing valve 32, a reducing valve 33 and a differential check valve 34, all disposed in a valve body 10. Sequence valve 31 comprises a valve spool 36 slidably disposed in a valve bore 37 and urged in an upward position (FIG. 1) by means of a biasing spring 38. Safety valve 24 includes a valve spool 41 slidably disposed in a valve bore 42 and urged in an upward position by means of a biasing spring 43. Modulating reducing valve 32 comprises a valve spool 46 slidably disposed in a valve bore 47 and urged downwardly by a biasing spring 48. Biasing spring 48 is connected at one end to spool 46 and at its other end to a load piston 49 which is slidably disposed in valve bore 47. The load piston 49 is conventional in modulating valves and provides means by which the force acting downwardly on spool 46 can be regulated.

Reducing valve 33 includes a valve spool 51 slidably disposed in valve bore 52 and urged downwardly by a biasing spring 53. Communicating with reducing valve 33 through a passageway 54 is differential check valve 34 which comprises a valve spool 56 slidably disposed in a valve bore 57 and urged downwardly by a biasing spring 58.

As mentioned above, the components of valve group 14 are illustrated in FIG. 1 in the positions which they assume when no pressure is acting on them, due to the fact that the vehicle engine is not operating. If the vehicle were to be started and the pump supplying working fluid operated without the vehicle transmission control positioned to neutral, fluid would enter a chamber 61 through conduit 13a and pass into a radial port 62 in spool 36 whereafter it would travel through a longitudinal passage 63 and out a plurality of radial ports 64 to an internal chamber 66 which is in direct communication with a drain line 67. Consequently, the fluid being pumped into the valve group would simply circulate therethrough without having any significant effect thereon.

When the safety reset valve 16 (FIG. 2) is positioned to pass fluid, fluid enters the upper portion of safety valve 24 via conduit 26 and urges spool 41 downward such that chamber 66 and consequently drain line 67 are hydraulically separated from chamber 61 and input conduit 13a. Under these conditions the fluid which enters longitudinal passage 63 via radial port 62 builds up pressure in a chamber 68 within spool 36. The pressure in chamber 68 acts against a slug 69 so as to counteract the force of spring 38 and urge spool 36 downward. This downward movement of spool 36 provides communication between chamber 61 (and thus input conduit 13a) and a connecting passageway 71, around spool 41, leading to bore 47 of modulating reducing valve 32. The fluid in connecting passage 71 passes an annular orifice 72 formed by spool 46 and the valve group body 10 into a chamber 73 which surrounds the lower end of spool 46. The lower end of spool 46 includes a compartment 74 which communicates with surrounding chamber 73 via a radial port 76. Also in communication with surrounding chamber 73 is output conduit 17 leading to selector valve 18. Thus, by positioning the vehicle transmission control means to neutral, fluid is able to pass through the valve control group to the selector valve 18 and from there to one of the fluid actuated devices 19. As the pressure increases in the fluid actuated device 19 associated with selector valve 18 the pressure in chamber 73 will also increase with a corresponding increase in the pressure in compartment 74. As the pressure in compartment 74 acting against slug 75 becomes sufficient to establish a force which can counteract biasing spring 48, spool 46 will move upward so as to close the annular orifice 72. If the transmission is left in its neutral condition, an equilibrium will be established whereby the annular orifice 72 will open and close as the needs of the device 19 demand.

When the control shaft 27 is in that position which corresponds to placing the transmission in neutral, not only is spool 28 positioned to pass fluid through safety reset valve 16 but the spool 77 associated with valve 18 is positioned to prevent fluid from passing through the valve 18 to conduit 29. Since the present invention relates to transmission control systems wherein two or more fluid actuated devices must be supplied with working fluid before the transmission can be conditioned to a driving state the fact that one of the devices 19 receives working fluid does not prevent the transmission from having an overall condition corresponding to neutral.

Referring momentarily to FIG. 6, point $a$ represents the pressure in both the devices associated with selector valve 18 and those associated with selector valve 22 when the conditions exist which were described with reference to FIG. 1 (no pressure being furnished to the control valve group). Points $b_1$ and $b_2$ represent the pressures which exist when the conditions which were described with reference to FIG. 2 prevail (transmission in neutral) wherein $b_1$ represents the pressure in the device 19 and $b_2$ the lack of pressure in either of devices 23.

When control shaft 27 is positioned to condition the transmission from a neutral to a driving state, the impasse posed by spool 77 between conduits 17 and 29 is effectively removed such that fluid will flow from conduit 29 to conduit 21 through control group 14 and the components of the control group will assume the positions shown in FIG. 3. Due to the initiation of flow by the change in position of spool 77, the pressure in chamber 73 will drop causing a corresponding drop in pressure in compartment 74 and thereby enable spring 48 to urge spool 46 to its downward position and thus provide the maximum area of annular orifice 72.

The fluid flowing into valve group 14 via conduit 29 enters a passage 70 which leads to an annular orifice 80 formed by valve spool 51 and valve body 10. Communicating with orifice 80 is passage 54 leading to differential check valve 34. Fluid in passage 54 passes to the devices 23 associated with selector valve 22 via connecting conduit 21. Thus, when the transmission is initially shifted to a driving gear both conduits 17 and 21 pass fluid at the same fill pressure, as indicated in FIG. 6 at point $c$. Once the selected device 19 and the selected device 23 have filled with working fluid, pressure will begin to rise in conduit 17, conduit 29, passage 70, and passage 54. Passage 70 surrounds the lower portion of valve spool 51 which includes an internal compartment 81 which communicates with passage 54 via radial port 82. As the pressure increases in passage 54 fluid pressure builds up in compartment 81 and acts against a slug 83 to provide a force which counteracts that of spring 53 and urges spool 51 upwardly so as to diminish the area of the annular orifice 80. The rising pressure in passage 54 also causes spool 56 of differential check valve 34 to move upwardly against its spring 58 due to the pressure drop induced by the flow of fluid through longitudinal passage 84 and restrictive orifice 86. The upward movement of check valve 34 blocks previously existing communication between a chamber 87 behind load piston 49 and a drain line 88. By blocking the access of chamber 87 to a drain line the fluid which passes through restrictive orifice 86 into chamber 87 will be able to build up in pressure and induce load piston 49 to move downwardly against biasing spring 48 and thus increase the fluid pressure which must exist in compartment 74 in order to close the annular orifice 72. The gradual movement of load piston 49 in a downward direction modulates the pressure in conduit 17 in a steadily increasing manner so that the pressure supplied to the selected device 19 increases from a low value to a desired engaging value as indicated by the line existing between points *d* and *e* on the graph of FIG. 6. Since the pressure in passage 54 and thus conduit 21 is the same as the pressure in passage 17, the line between points *d* and *e* on the graph of FIG. 6 represents the increase in pressure in the selected device 23 as well as that in the selected device 19.

As the pressure in chamber 81 increases valve spool 51 moves up causing the area of the annular orifice 80 to reduce to zero whereby the valve 33 assumes a closed position. When reducing valve 33 closes initially (FIG. 4) the pressure in chamber 87 is a fraction (for example ⅓) of that in passage 54 by virtue of the area ratio between slug 75 and load piston 49. At this point the pressure in chamber 87 is not stabilized and attempts to go higher by virtue of fluid flow from passage 54 through restrictive orifice 86. Load piston 49 moves downwardly as the balance tries to occur and this causes further flow from passage 54 and subsequent lowering of the pressure in this passage. Any lowering of pressure in passage 54 however, acts through chamber 81 to allow reducing valve 33 to open again and supply additional fluid. This cycling or metering continues until load piston 49 contacts modulating reducing valve 32 and the pressure in chamber 87 approaches the pressure in chamber 54—no additional flow being required to fill chamber 87. The rising pressure in chamber 87 acts on differential check valve 34 through radial orifices 91 and chamber 92 to supplement the force of spring 58 and subsequently urge the check valve downwardly to the metering condition for the first time in the sequence as shown in FIG. 5. In the metering condition a fixed pressure differential exists across spool 56 which is dependent on the setting of spring 58.

When the desired maximum pressure to be applied to the selected device 23 is obtained in passage 54, the pressure existing in compartment 81 will be sufficient to cause a metering of fluid through the orifice 80 to maintain the pressure at *e*. When load piston 49 has travelled the maximum possible distance downward, the transmission engaging devices will be in their steady state operating conditions (as indicated by points $g_1$ and $g_2$ of FIG. 6) and the components of valve group 14 will assume the positions shown in FIG. 5. It is seen that by the unique disposition of the differential check valve 34 the same modulated pressure can be applied to the selected device 19 and the selected device 23 up to a certain pressure, after which time only one of the devices continues to receive increasing pressure fluid.

By the proper choice of spring constants for springs 53, 58 and 48 and the size of the various restrictive orifices the particular values of pressure and times of modulation can be designed to suit the various requirements of different vehicles.

Special attention is drawn to the fact that differential check valve 34 (see FIG. 5 in particular) is supplied with radial orifices 91 leading to the chamber 92 which houses the biasing spring 58. In this manner, the pressure which is built up in chamber 87 during the modulation cycle is also present in chamber 92 so that a loss of pressure in passage 54 accompanying a change in the selected device 23 will result in a downward movement of spool 56 since the forces acting downwardly on it are not only the spring 58 but also the pressure in the spring chamber. If a check valve were used which employed a closed spring chamber, the spring constant of spring 58 would have to be sufficiently great to insure that the spool 56 would move downwardly at the proper time so as to initiate a new modulation cycle when a gear change was made, but the spring constant could not be so high as to make the upward movement of spool 56 to block drain 88 sluggish. The present invention enables a relatively weak spring 58 to be used to insure a quick response to pressures inducing the check valve to block drain 88 and yet act promptly to initiate a new modulation cycle.

We claim:

1. In a transmission control system for supplying modulated pressure fluid to two separate fluid actuated devices wherein both devices are to receive fluid at the same pressure and at the same increasing pressure rate until one device has a predetermined maximum pressure supplied thereto after which only the other device receives fluid of further increased pressure, comprising in combination;

a source of fluid pressure;

first valve means communicating with said source of pressure and having an output of variable pressure, the pressure at the output of said valve means regulated by fluid pressure applied to a regulating means associated with said valve means;

second valve means receiving the fluid from the output of said first valve means and directing it to an output, said second valve means responsive to a predetermined pressure at its output to block communication between the output of said first valve means and the output of said second valve means;

said regulating means of said first valve means operative to reduce the pressure at the output of said second valve means each time it increases the pressure at the output of said first valve means whereby the output of said second valve means communicates with the output of said first valve means until the predetermined pressure at the output of said second valve means is re-established; and third valve means including a restrictive orifice to cause a pressure drop hydraulically communicating the output of said second valve means with said pressure regulating means of said first valve means whereby increased pressure at the output of said second valve means induces the first valve means to increase the pressure at its output, which increases the pressure at the output of said second valve means, the orifice in said third valve means operative to maintain a pressure drop between the output of the second valve means and said regulating means until equilibrium conditions are achieved.

2. In a transmission control system wherein working fluid is to be supplied to two separate fluid actuated devices the combination comprising;

a source of hydraulic pressure;

modulating valve means hydraulically disposed between one of the devices and said source, said valve means including means responsive to hydraulic pressure to open said valve means to increase the pressure of the fluid between the valve means and its corresponding device;

reducing valve means hydraulically disposed between the other device and the device side of said modulating valve means, said reducing valve means responsive to a predetermined pressure at its output to block communication between the other device and the modulating valve means; and differential valve means hydraulically disposed between said reducing valve means and the pressure responsive means of said modulating valve means, said differential valve means including means operative to establish a pressure drop during the time when the pressure to the other device is increasing.

3. The control system of claim 2 further described by the pressure responsive means communicating with a low pressure drain line, and said differential valve means comprising a valve spool disposed in a bore forming a portion of the communication between the pressure responsive means and the drain line, said spool responsive to pressure from said reducing valve means to block the communication between the pressure responsive means and the drain line and communicate the pressure responsive means with said reducing valve means through a restrictive orifice formed in said spool.

4. The system of claim 3 wherein said differential valve means further includes a spring disposed in a chamber in one end of said spool, said spring urging said spool to unblock the drain, and ports in said spool which hydraulically communicate the chamber containing said spring with the pressure responsive means.

5. A hydraulic system for establishing two sources of controlled pressure fluid comprising in combination a source of hydraulic pressure;

a first conduit supplying controlled fluid pressure;

first valve means hydraulically disposed between said fluid source and said first conduit, said first valve means operable to regulate the pressure of fluid passing from said source to said first conduit;

a valve regulating means forming part of said first valve means, said valve regulating means responsive to fluid pressure to open said valve means to increase the pressure at the output of said first valve means, and further operative to expand the volume occupied by the fluid acting on said valve regulating means until an extreme position is reached;

second valve means hydraulically disposed to receive pressure fluid from said first valve means and responsive to a predetermined pressure to prevent fluid flow therethrough;

third valve means hydraulically disposed between said second valve means and said valve regulating means and forming communication therebetween, said third valve means operative to establish a pressure drop which is maintained as long as fluid flow exists past said second valve means and which is equalized by the pressure acting on said valve regulating means increasing, after fluid flow past said second valve means has stopped for a given period of time; and a second conduit hydraulically disposed between said second valve means and said third valve means, for supplying controlled pressure fluid.

References Cited by the Examiner
UNITED STATES PATENTS 2,969,806   1/1961   Jensen   137—495
3,025,717   3/1962   Christenson   137—115 XR ISADOR WEIL, *Primary Examiner.*